United States Patent
Katrak

(10) Patent No.: US 10,714,928 B2
(45) Date of Patent: Jul. 14, 2020

(54) DIAGNOSTIC SYSTEM FOR A VEHICLE ELECTRICAL SYSTEM HAVING A DC-DC VOLTAGE CONVERTER AND A VOLTAGE REGULATOR

(71) Applicant: LG Chem, Ltd., Seoul (KR)

(72) Inventor: Kerfegar K. Katrak, Fenton, MI (US)

(73) Assignee: LG Chem, Ltd., Seoul (KR)

( * ) Notice: Subject to any disclaimer, the term of this patent is extended or adjusted under 35 U.S.C. 154(b) by 379 days.

(21) Appl. No.: 15/928,214

(22) Filed: Mar. 22, 2018

(65) Prior Publication Data

US 2019/0036328 A1    Jan. 31, 2019

Related U.S. Application Data

(60) Provisional application No. 62/538,863, filed on Jul. 31, 2017.

(51) Int. Cl.
*H02H 7/12*    (2006.01)
*H02H 1/00*    (2006.01)
(Continued)

(52) U.S. Cl.
CPC ........ *H02H 7/1213* (2013.01); *H02H 1/0007* (2013.01); *H02H 3/207* (2013.01);
(Continued)

(58) Field of Classification Search
CPC .... H02H 7/1213; H02H 1/0007; H02H 3/207; G01R 1/206; G01R 31/40; H02M 1/32
See application file for complete search history.

(56) References Cited

U.S. PATENT DOCUMENTS 6,741,436 B2    5/2004    Gilbert et al.
7,923,865 B2    4/2011    Melse
(Continued)

FOREIGN PATENT DOCUMENTS

JP       4630173 B2      2/2011
KR     101096613 B1     12/2011
(Continued)

OTHER PUBLICATIONS

U.S. Appl. No. 15/646,155, filed Jul. 11, 2017 entitled Diagnostic System for a DC-DC Voltage Converter.
(Continued)

*Primary Examiner* — Yusef A Ahmed
(74) *Attorney, Agent, or Firm* — Buckert Patent & Trademark Law Firm PC; John F. Buckert

(57) ABSTRACT

A diagnostic system is provided. A first monitoring application sets a first voltage regulator status flag equal to a first fault value when a first voltage value is greater than a first maximum voltage value. A first diagnostic handler application transitions each of a high voltage switch and a low voltage switch to an open operational state when the first voltage regulator status flag is equal to the first fault value. A second monitoring application sets a second voltage regulator status flag equal to a second fault value when the second voltage value is less than a first minimum voltage value. A second diagnostic handler application transitions the high voltage switch and the low voltage switch to the open operational state when the second voltage regulator status flag is equal to the second fault value.

10 Claims, 13 Drawing Sheets

(51) Int. Cl.
*H02M 3/156* (2006.01)
*H02M 3/157* (2006.01)
*H02H 3/20* (2006.01)
*H02M 1/32* (2007.01)

(52) U.S. Cl.
CPC ........... *H02M 3/156* (2013.01); *H02M 3/157* (2013.01); *H02M 1/32* (2013.01)

(56) References Cited

U.S. PATENT DOCUMENTS

| | | | |
|---|---|---|---|
| 8,385,030 | B2 | 2/2013 | Maher |
| 8,587,283 | B2 | 11/2013 | Wu |
| 8,907,642 | B1 | 12/2014 | Burstein et al. |
| 9,759,784 | B2 | 9/2017 | Lachaize et al. |
| 2006/0054601 | A1 | 3/2006 | Ilic et al. |
| 2007/0133236 | A1 | 6/2007 | Usui |
| 2009/0085535 | A1* | 4/2009 | Wei ................. H02M 3/156 323/272 |
| 2010/0202161 | A1* | 8/2010 | Sims ................. H02M 7/02 363/20 |
| 2011/0128761 | A1 | 6/2011 | Ripley et al. |
| 2011/0169470 | A1 | 7/2011 | Itakura |
| 2012/0242365 | A1* | 9/2012 | Singh ................. G01R 31/343 324/762.01 |
| 2014/0160804 | A1 | 6/2014 | Sato et al. |
| 2014/0313784 | A1 | 10/2014 | Strzalkowski |
| 2016/0118900 | A1 | 4/2016 | Nate et al. |
| 2017/0363691 | A1* | 12/2017 | Katrak ............. G01R 19/165 |
| 2017/0363692 | A1 | 12/2017 | Katrak et al. |
| 2017/0365996 | A1* | 12/2017 | Katrak ............. G01R 19/16576 |
| 2019/0025383 | A1* | 1/2019 | Katrak ............. H02M 1/32 |
| 2019/0033358 | A1* | 1/2019 | Katrak ............. G05F 1/575 |
| 2019/0033359 | A1* | 1/2019 | Katrak ............. G01R 31/007 |
| 2019/0034262 | A1* | 1/2019 | Katrak ............. H02M 7/217 |
| 2019/0034307 | A1* | 1/2019 | Katrak ............. G06F 11/26 |
| 2019/0035175 | A1* | 1/2019 | Katrak ............. G01R 19/2513 |
| 2019/0036454 | A1* | 1/2019 | Katrak ............. H02M 1/32 |
| 2019/0039457 | A1* | 2/2019 | Katrak ............. B60L 3/0038 |

FOREIGN PATENT DOCUMENTS

| | | |
|---|---|---|
| KR | 20120092681 A | 8/2012 |
| KR | 101283256 B1 | 7/2013 |
| KR | 101625864 B1 | 6/2016 |
| KR | 20170078437 A | 7/2017 |

OTHER PUBLICATIONS

U.S. Appl. No. 15/651,005, filed Jul. 17, 2017 entitled Control System for Controlling Operational Modes of a DC-DC Voltage Converter.

U.S. Appl. No. 15/682,143, filed Aug. 21, 2017 entitled Control System for Transitioning a DC-DC Voltage Converter From a Buck Operational Made to a Safe Operational Mode.

U.S. Appl. No. 15/722,326, filed Oct. 2, 2017 entitled Control System for Transtioning a DC-DC Converter From a Boost Operational Mode to a Safe Operational Mode.

U.S. Appl. No. 15/808,967, filed Nov. 10, 2017 entitled Diagnostic System for a DC-DC Voltage Converter.

U.S. Appl. No. 15/910,422, filed Mar. 2, 2018 entitled Diagnostic System for a DC-DC Voltage Converter.

\* cited by examiner

FAULT AND NON-FAULT VALUES TABLE

| | NON-FAULT VALUE (HEXADECIMAL) | FAULT VALUE (HEXADECIMAL) |
|---|---|---|
| FIRST VOLTAGE REGULATOR MONITORING APPLICATION (OORH-5V) | 6C | C6 |
| SECOND VOLTAGE REGULATOR MONITORING APPLICATION (OORL-5V) | A3 | 3A |
| THIRD VOLTAGE REGULATOR MONITORING APPLICATION (OORH-3.3V) | C6 | 6C |
| FOURTH VOLTAGE REGULATOR MONITORING APPLICATION (OORL-3.3V) | 3A | A3 |
| FIFTH VOLTAGE REGULATOR MONITORING APPLICATION (OORH-12.0V) | C5 | 5C |
| SIXTH VOLTAGE REGULATOR MONITORING APPLICATION (OORH-12.0V) | 5C | C5 |
| SEVENTH VOLTAGE REGULATOR MONITORING APPLICATION (OORL-12.0V) | 56 | 65 |
| EIGHTH VOLTAGE REGULATOR MONITORING APPLICATION (OORL-12.0V) | 65 | 56 |

FIG. 2

DIAGNOSTIC SYSTEM FOR A VEHICLE ELECTRICAL SYSTEM HAVING A DC-DC VOLTAGE CONVERTER AND A VOLTAGE REGULATOR

CROSS-REFERENCE TO RELATED APPLICATION

This application claims priority to U.S. Provisional Patent Application No. 62/538,863 filed on Jul. 31, 2017, the entire contents of which are hereby incorporated by reference herein.

BACKGROUND

The inventor herein has recognized a need for an improved diagnostic system for a vehicle electrical system having a DC-DC voltage converter and a voltage regulator that utilizes first and second voltage regulator monitoring applications that can each separately detect an overvoltage condition in the voltage regulator.

SUMMARY

A diagnostic system for a vehicle electrical system having a DC-DC voltage converter and a voltage regulator in accordance with an exemplary embodiment is provided. The DC-DC voltage converter has a DC-DC voltage converter control circuit that is coupled between a high voltage switch and a low voltage switch. The voltage regulator has first and second output terminals outputting first and second voltages, respectively. The diagnostic system includes a microcontroller having a microprocessor and a first analog-to-digital converter. The microprocessor has first and second voltage regulator monitoring applications and first and second diagnostic handler applications. The first analog-to-digital converter measures the first voltage of the voltage regulator at a first time and generates a first voltage value based on the first voltage. The first voltage regulator monitoring application sets a first voltage regulator status flag equal to a first fault value when the first voltage value is greater than a first maximum voltage value. The first diagnostic handler application transitions each of the high voltage switch and the low voltage switch to an open operational state when the first voltage regulator status flag is equal to the first fault value. The first analog-to-digital converter measures the first voltage at a second time and generates a second voltage value based on the first voltage. The second voltage regulator monitoring application sets a second voltage regulator status flag equal to a second fault value when the second voltage value is less than a first minimum voltage value. The second diagnostic handler application transitions each of the high voltage switch and the low voltage switch to the open operational state when the second voltage regulator status flag is equal to the second fault value.

A diagnostic system for a vehicle electrical system having a DC-DC voltage converter and a voltage regulator in accordance with another exemplary embodiment is provided. The DC-DC voltage converter has a DC-DC voltage converter control circuit that is coupled between a high voltage switch and a low voltage switch. The voltage regulator has a first output terminal outputting a first voltage. The diagnostic system includes a microcontroller having a microprocessor and first and second analog-to-digital converters. The microprocessor has first and second voltage regulator monitoring applications and first and second diagnostic handler applications. The first analog-to-digital converter measures the first voltage of the voltage regulator at a first time and generates a first voltage value based on the first voltage. The first voltage regulator monitoring application sets a first voltage regulator status flag equal to a first fault value when the first voltage value is greater than a first maximum voltage value. The first diagnostic handler application transitions each of the high voltage switch and the low voltage switch to an open operational state when the first voltage regulator status flag is equal to the first fault value. The second analog-to-digital converter measures the first voltage at a second time and generates a second voltage value based on the first voltage. The second voltage regulator monitoring application sets a second voltage regulator status flag equal to a second fault value when the second voltage value is greater than a second maximum voltage value. The second maximum voltage value is greater than the first maximum voltage value. The second diagnostic handler application transitions each of the high voltage switch and the low voltage switch to the open operational state when the second voltage regulator status flag is equal to the second fault value.

BRIEF DESCRIPTION OF THE DRAWINGS

FIG. 2 is a schematic of a table having non-fault values and fault values utilized by the diagnostic system of FIG. 1;

DETAILED DESCRIPTION

Figure 1:
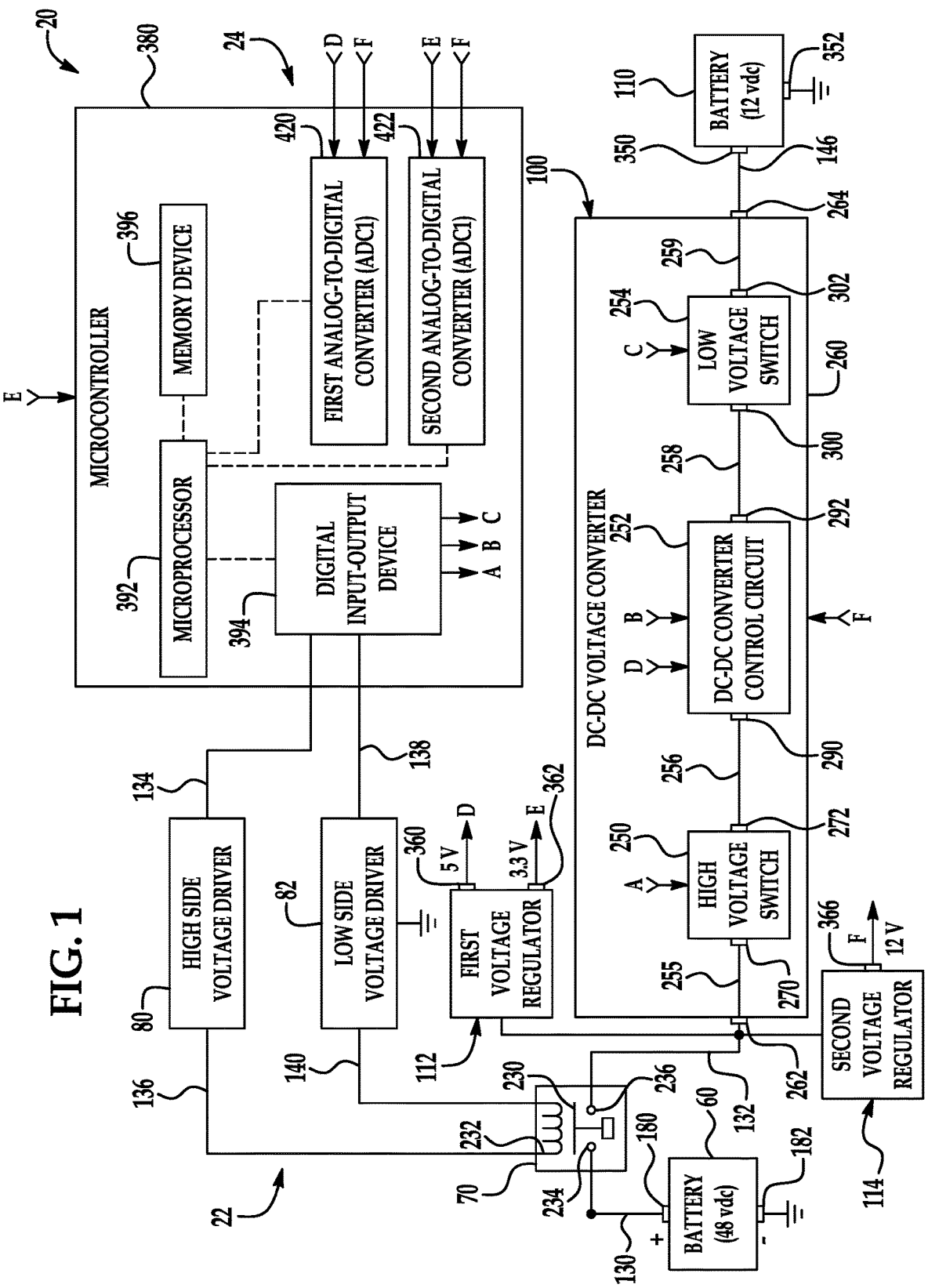
FIG. 1 is a schematic of a vehicle having a diagnostic system for a vehicle electrical system in accordance with an exemplary embodiment.

Referring to FIG. 1, a vehicle 20 is provided. The vehicle 20 includes a vehicle electrical system 22, and a diagnostic system 24 in accordance with an exemplary embodiment.

The vehicle electrical system 22 includes a voltage source 54, a battery 60, a contactor 70, a high side voltage driver 80, a low side voltage driver 82, a DC-DC voltage converter 100, a battery 110, a first voltage regulator 112, a second voltage regulator 114, and electrical lines 130, 132, 134, 136, 138, 140, 146.

An advantage of the diagnostic system 24 is that the system 24 utilizes first and second voltage regulator monitoring applications that can each separately detect an overvoltage condition in the first voltage regulator 112. Further, the diagnostic system 24 utilizes fault values having a Hamming distance of at least four from one another to eliminate memory overwrite errors associated with status flags utilizing the values.

For purposes of understanding, a node is a region or a location in an electrical circuit.

The term "substantially" means±5% of a value herein.

The term "minimum voltage value" means a minimum threshold voltage value.

The term "maximum voltage value" means a maximum threshold voltage value.

The term "OORH" means an out of range high test or an overvoltage test.

The term "OORL" means an out of range low test or an under voltage test.

The battery 60 includes a positive terminal 180 and a negative terminal 182. In an exemplary embodiment, the battery 60 generates substantially 48 Vdc between the positive terminal 180 and the negative terminal 182. The positive terminal 180 is electrically coupled to a node 234 of the contactor 70. The negative terminal 182 is electrically coupled to electrical ground.

The contactor 70 has a contact 230, a contactor coil 232, a first node 234, and a second node 236. The first node 234 is electrically coupled to the positive terminal 180 of the battery 60 utilizing the electrical line 130. The second node 236 is electrically coupled to the high voltage terminal 262 of the DC-DC voltage converter 100 utilizing the electrical line 132. When the digital input-output device 394 of the microcontroller 380 generates first and second control signals that are received by the high side voltage driver 80 and the low side voltage driver 82, respectively, the contactor coil 232 is energized which transitions the contact 230 to a closed operational state. Alternately, when the digital input-output device 394 of the microcontroller 380 generates third and fourth control signals that are received by the high side voltage driver 80 and the low side voltage driver 82, respectively, the contactor coil 232 is de-energized which transitions the contact 230 to an open operational state. In an exemplary embodiment, the third and fourth control signals can each be a ground voltage level.

The high side voltage driver 80 and the low side voltage driver 82 are provided to energize or de-energize the contactor coil 232.

The high side voltage driver 80 is electrically coupled to a digital input-output device 394 of the microcontroller 380 utilizing the electrical line 134. The high side voltage driver 80 is further electrically coupled to a first end of the contactor coil 232 utilizing the electrical line 136. The high side voltage driver 144 energizes the contactor coil 232, when the high side voltage driver 144 receives a control signal from the digital input-output device 394.

The low side voltage driver 82 is electrically coupled to the digital input-output device 394 of the microcontroller 380 utilizing the electrical line 138. The low side voltage driver 82 is further electrically coupled to a second end of the contactor coil 232 utilizing the electrical line 140. The low side voltage driver 82 is configured to conduct an electrical current therethrough to the electrical ground for energizing the contactor coil 232, when the low side voltage driver 82 receives a control signal from the digital input-output device 394.

The DC-DC voltage converter 100 includes a high voltage switch 250, a DC-DC converter control circuit 252, a low voltage switch 254, electrical lines 255, 256, 258, 259, a housing 260, a high voltage terminal 262, and a low voltage terminal 264. The housing 260 holds the high voltage switch 250, the DC-DC converter control circuit 252, and the low voltage switch 254 therein.

The high voltage switch 250 includes a first node 270 and a second node 272. The first node 270 is electrically coupled to the high voltage terminal 262 utilizing the electrical line 255, and the high voltage terminal 262 is further electrically coupled to the second node 236 of the contactor 70 utilizing the electrical line 132. The second node 272 is electrically coupled to a first node 290 of the DC-DC converter control circuit 252 utilizing the electrical line 256. In an exemplary embodiment, the high voltage switch 250 is a bi-directional MOSFET switch having desired voltage and current capabilities. When the microcontroller 380 generates a first control signal that is received by the high voltage switch 250 (or that is received by a controller or a microprocessor within the DC-DC voltage converter 100 that is operably coupled to the switch 250), the microcontroller 380 induces the switch 250 to transition to a closed operational state. When the microcontroller 380 generates a second control signal, the microcontroller 380 induces the switch 250 to transition to an open operational state. In an exemplary embodiment, the second control signal is a ground level control signal.

The DC-DC converter control circuit 252 has a first node 290 and a second node 292. The DC-DC converter control circuit 252 has internal FETs that are selectively switched to convert a DC voltage received at the first node 290 to another DC voltage output at the second node 292, based on control signals from the microcontroller 380. Alternately, the DC-DC converter control circuit 252 selectively switches the internal FETs to convert a DC voltage received at the second node 292 to another DC voltage that is output at the first node 290, based on control signals from the microcontroller 380.

The low voltage switch 254 includes a first node 300 and a second node 302. The first node 300 is electrically coupled to the second node 292 of the DC-DC converter control circuit 252 utilizing the electrical line 258. The second node 302 is electrically coupled to the low voltage terminal 264 utilizing the electrical line 259, and the low voltage terminal 264 is further electrically coupled to the battery 110 utilizing the electrical line 146. In an exemplary embodiment, the low voltage switch 254 has an identical structure as the high voltage switch 250. In an exemplary embodiment, the low voltage switch 254 is a bi-directional MOSFET switch having desired voltage and current capabilities. When the microcontroller 380 generates a first control signal that is received by the low voltage switch 254 (or that is received by a controller or a microprocessor within the DC-DC voltage converter 100 that is operably coupled to the switch 254), the microcontroller 380 induces the switch 254 to transition to a closed operational state. When the microcontroller 380 generates a second control signal, the microcontroller 380 induces the switch 254 to transition to an open operational state. In an exemplary embodiment, the second control signal is a ground level control signal.

The battery 110 includes a positive terminal 350 and a negative terminal 352. In an exemplary embodiment, the battery 110 generates substantially 12 Vdc between the positive terminal 350 and the negative terminal 352. The positive terminal 350 is electrically coupled to the low voltage terminal 264 of the DC-DC voltage converter 100. The negative terminal 352 is electrically coupled to an electrical ground, which may be electrically isolated from the electrical ground associated with the battery 60.

Figure 3:
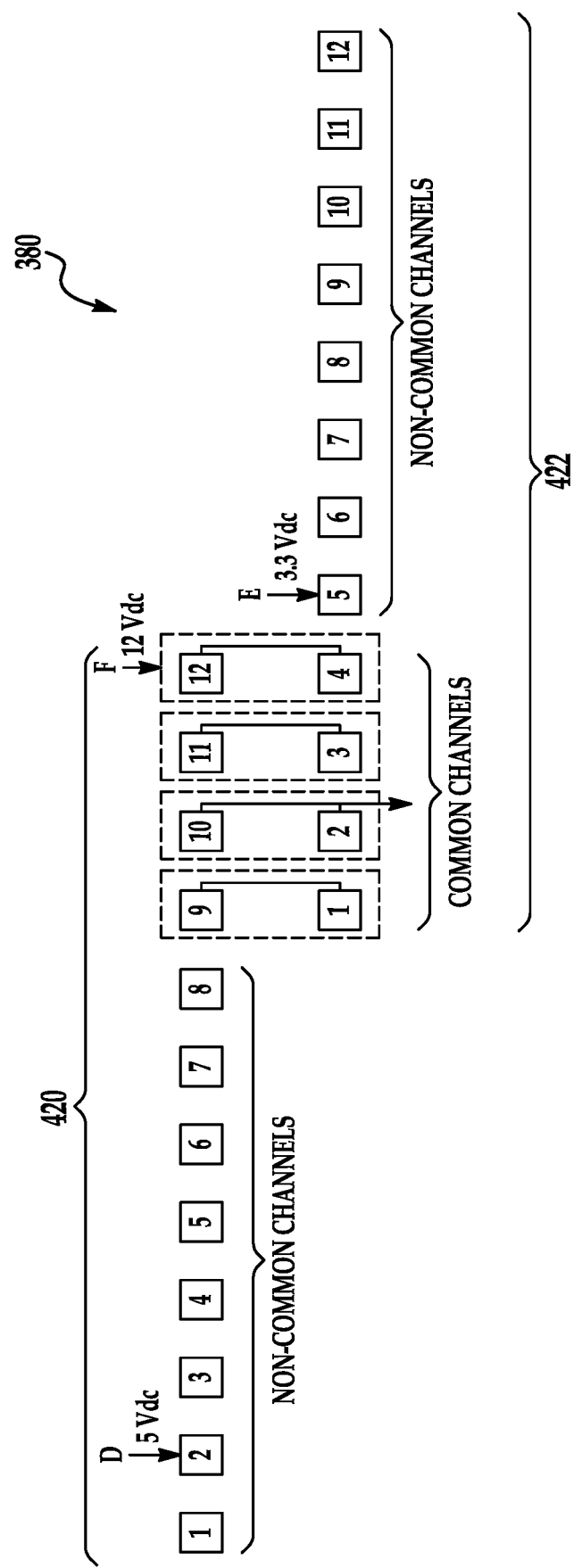
FIG. 3 is a schematic of first and second analog-to-digital converters in a microcontroller utilized by the diagnostic system of FIG. 1.

Referring to FIGS. 1 and 3, the first voltage regulator 112 has output terminals 360, 362 that output first and second voltages (e.g., substantially 5 Vdc and 3.3 Vdc), respectively. The output terminal 360 is electrically coupled to the DC-DC converter control circuit 252 and provides 5 Vdc thereto. The output terminal 360 is further electrically coupled to the non-common channel 2 of the first analog-to-digital converter 420. The output terminal 362 is electrically coupled to the microcontroller 380 and to the non-common channel 5 of the second analog-to-digital converter 422 and provides 3.3 Vdc thereto.

The second voltage regulator 114 has an output terminal 366 that outputs a voltage (e.g., substantially 12 Vdc). The output terminal 366 is electrically coupled to the DC-DC voltage converter 100 and provides 12 Vdc thereto. The output terminal 366 is further electrically coupled to the common channel 12 of the first analog-to-digital converter 420 and to the common channel 4 of the second analog-to-digital converter 422.

The diagnostic system 24 of the DC-DC voltage converter 100 and the voltage regulators 112, 114 includes a microcontroller 380 having a microprocessor 392, a digital input-output device 394, a memory device 396, the first analog-to-digital converter 420, and the second analog-to-digital converter 422.

The first analog-to-digital converter 420 includes non-common channels 1, 2, 3, 4, 5, 6, 7, 8 and common channels 9, 10, 11, 12. The non-common channel 2 is electrically coupled to the output terminal 360 of the first voltage regulator 112 for measuring a voltage at the output terminal 360. The common channel 12 is electrically coupled to the output terminal 366 of the second voltage regulator 114 for measuring a voltage at the output terminal 366.

The second analog-to-digital converter 422 includes non-common channels 1, 5, 6, 7, 8, 9, 10, 11, 12 and common channels 1, 2, 3, 4. The non-common channel 5 of the second analog-to-digital converter 422 is electrically coupled to the output terminal 362 of the first voltage regulator 112 for measuring a voltage at the output terminal 362. The common channel 4 of the second analog-to-digital converter 422 is electrically coupled to both the common channel 12 of the first analog-to-digital converter 420 and to the output terminal 366 of the second voltage regulator 114 for measuring a voltage at the output terminal 366.

Referring to FIG. 1, the microcontroller 380 is programmed to monitor voltages utilizing the microprocessor 392 which executes software instructions stored in the memory device 396. The microprocessor 392 is operably coupled to the digital input-output device 394, the memory device 396, the first analog-to-digital converter 420, and the second analog-to-digital converter 422. The digital input-output device 394 outputs digital control signals that are received by the voltage drivers 80, 82 for controlling the operation of the contactor 70. The memory device 396 stores data, tables, and the software applications described herein for implementing the methods described therein.

Referring to FIGS. 1 and 2, a table 700 that is stored in the memory device 396 and utilized by the microcontroller 380 is shown. The table 700 includes records 702, 704, 706, 708, 710, 712, 714, 716. The table 700 includes values that are utilized for setting the values of status flags associated with the vehicle electrical system 22. A status flag can either have a fault value indicating a fault operational condition or a non-fault value indicating a non-fault operational condition.

In particular, the record 702 is associated with a first voltage regulator monitoring application 860 (shown in FIG. 6) and includes a fault value of "C6" hexadecimal, and a non-fault value of "6C" hexadecimal.

Further, the record 704 is associated with a second voltage regulator monitoring application 900 (shown in FIG. 8) and includes a fault value of "3A" hexadecimal, and a non-fault value of "A3" hexadecimal.

Further, the record 706 is associated with a third voltage regulator monitoring application 940 (shown in FIG. 10) and includes a fault value of "6C" hexadecimal, and a non-fault value of "C6" hexadecimal.

Also, the record 708 is associated with a fourth voltage regulator monitoring application 980 (shown in FIG. 12) and includes a fault value of "A3" hexadecimal, and a non-fault value of "3A" hexadecimal.

Further, the record 710 is associated with a fifth voltage regulator monitoring application 1020 (shown in FIG. 14) and includes a fault value of "5C" hexadecimal, and a non-fault value of "C5" hexadecimal.

Also, the record 712 is associated with a sixth voltage regulator monitoring application 1060 (shown in FIG. 16) and includes a fault value of "C5" hexadecimal, and a non-fault value of "5C" hexadecimal.

Further, the record 714 is associated with a seventh voltage regulator monitoring application 1100 (shown in FIG. 18) and includes a fault value of "65" hexadecimal, and a non-fault value of "56" hexadecimal.

Also, the record 716 is associated with an eighth voltage regulator monitoring application 1140 (shown in FIG. 20) and includes a fault value of "56" hexadecimal, and a non-fault value of "65" hexadecimal.

Each of the fault values in the records 702-716 have a Hamming distance of the least four from one another to eliminate memory overwrite errors associated with status flags utilizing the values. Further, each of the non-fault values in the records 702-716 have a Hamming distance of the least four from one another to eliminate memory overwrite errors associated with status flags utilizing the values. Still further, each of the fault values in the records 702-716 have a Hamming distance of the least four from the non-fault values in the records 702-716 to eliminate memory overwrite errors associated with status flags utilizing the values.

Referring to FIGS. 1 and 4-21, a method of operating the diagnostic system 24 will now be explained. The method utilizes a main application 800, a first voltage regulator monitoring application 860, the first diagnostic handler application 880, a second voltage regulator monitoring application 900, a second diagnostic handler application 920, a third voltage regulator monitoring application 940, a third diagnostic handler application 960, a fourth voltage regulator monitoring application 980, a fourth diagnostic handler application 1000, a fifth voltage regulator monitoring application 1020, a fifth diagnostic handler application 1040, a sixth voltage regulator monitoring application 1060, a sixth diagnostic handler application 1080, a seventh voltage regulator monitoring application 1100, a seventh diagnostic handler application 1120, an eighth voltage regulator monitoring application 1140, and an eighth diagnostic handler application 1160.

Figure 4:
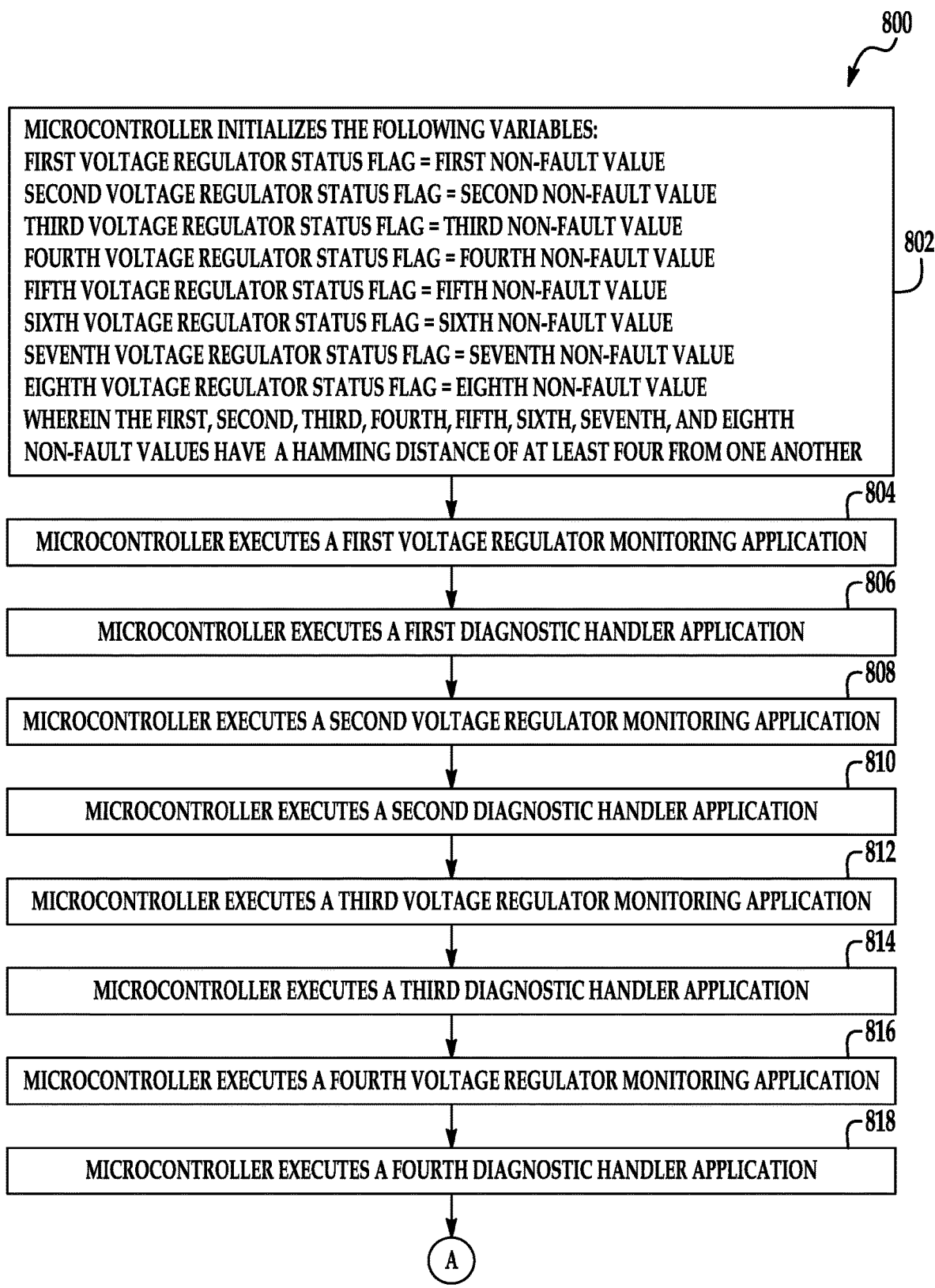
FIGS. 4 and 5 is a flowchart of a main application utilized in the diagnostic system of FIG. 1.
Figure 5:
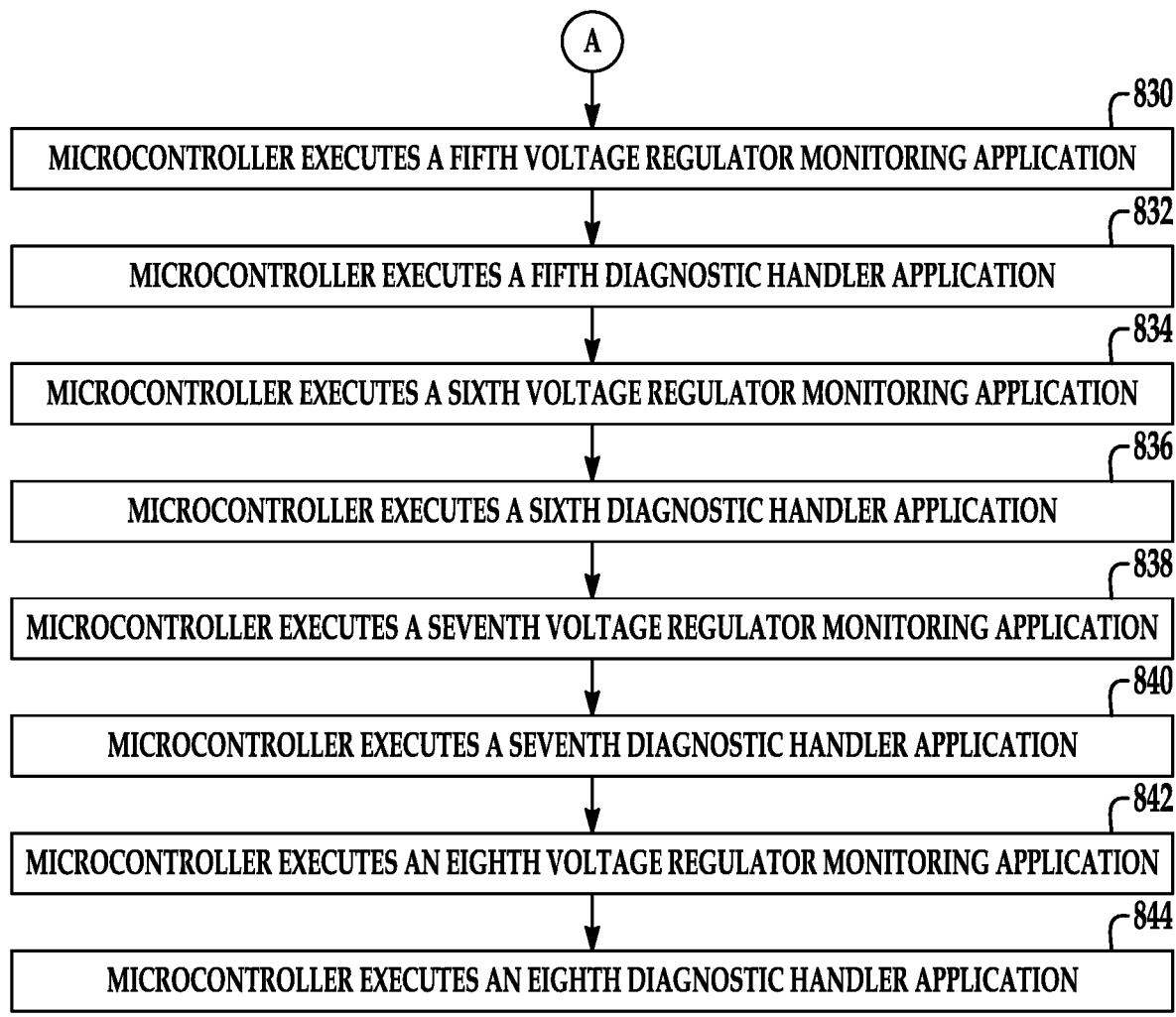

Referring to FIGS. 1, 4 and 5, the main application 800 will now be explained.

At step 802, the microcontroller 380 initializes the following variables:

first voltage regulator status flag=first non-fault value (e.g., 6C);

second voltage regulator status flag=second non-fault value (e.g., A3);

third voltage regulator status flag=third non-fault value (e.g., C6);

fourth voltage regulator status flag=fourth non-fault value (e.g., 3A);

fifth voltage regulator status flag=fifth non-fault value (e.g., CF);

sixth voltage regulator status flag=sixth non-fault value (e.g., 5C);

seventh voltage regulator status flag=seventh non-fault value (e.g., 56);

eighth voltage regulator status flag=eighth non-fault value (e.g., 65), wherein the first, second, third, fourth, fifth, sixth, seventh, and eighth non-fault values have a Hamming distance of at least four from one another. After step 802, the method advances to step 804.

Figure 6:
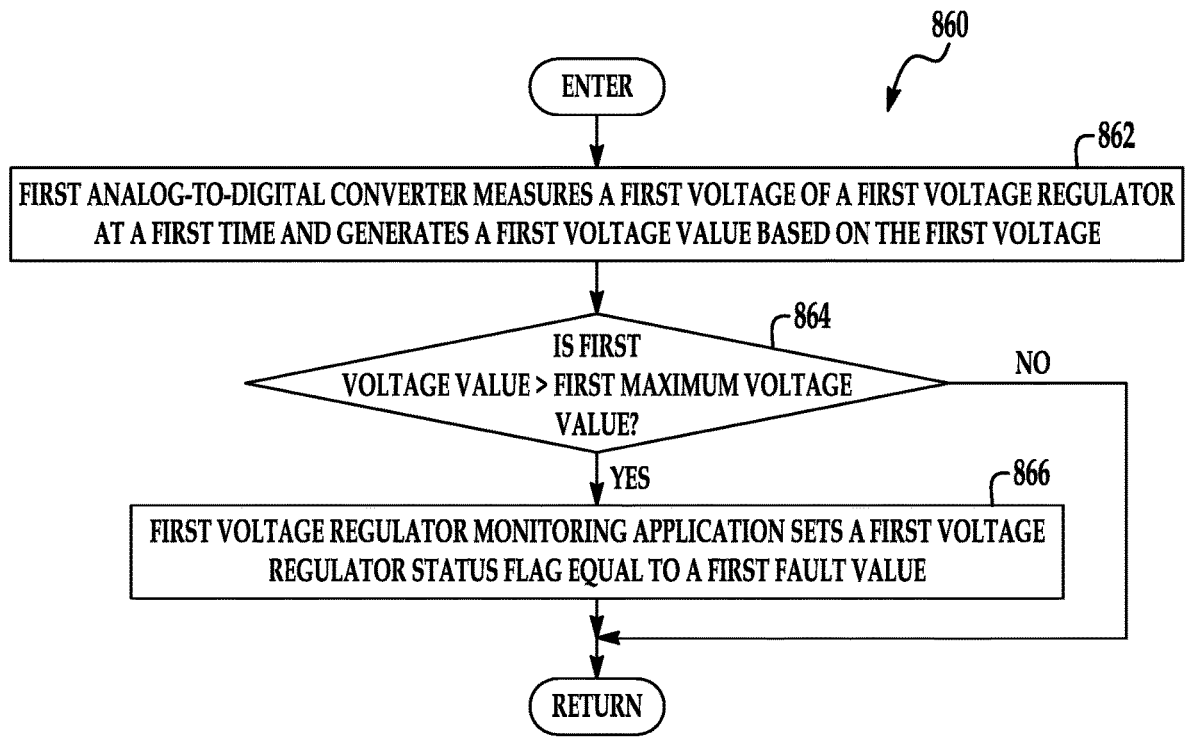
FIG. 6 is a flowchart of a first voltage regulator monitoring application utilized in the diagnostic system of FIG. 1.

At step 804, the microcontroller 380 executes a first voltage regulator monitoring application 860 (shown in FIG. 6). After step 804, the method advances to step 806.

Figure 7:
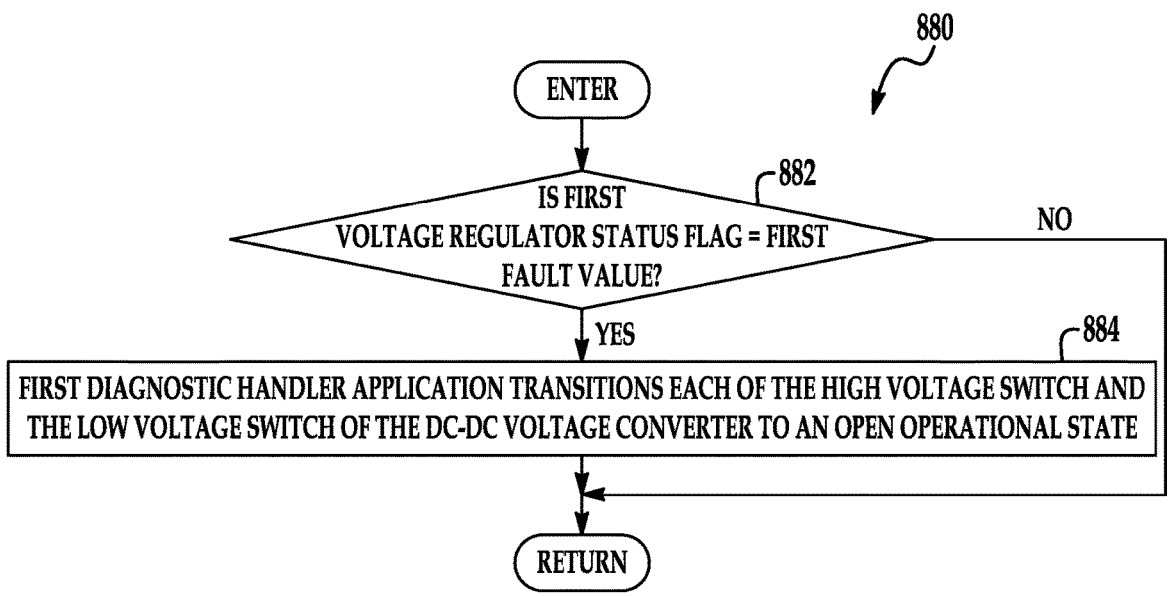
FIG. 7 is a flowchart of a first diagnostic handler application utilized in the diagnostic system of FIG. 1.

At step 806, the microcontroller 380 executes a first diagnostic handler application 880 (shown in FIG. 7). After step 806, the method advances to step 808.

Figure 8:
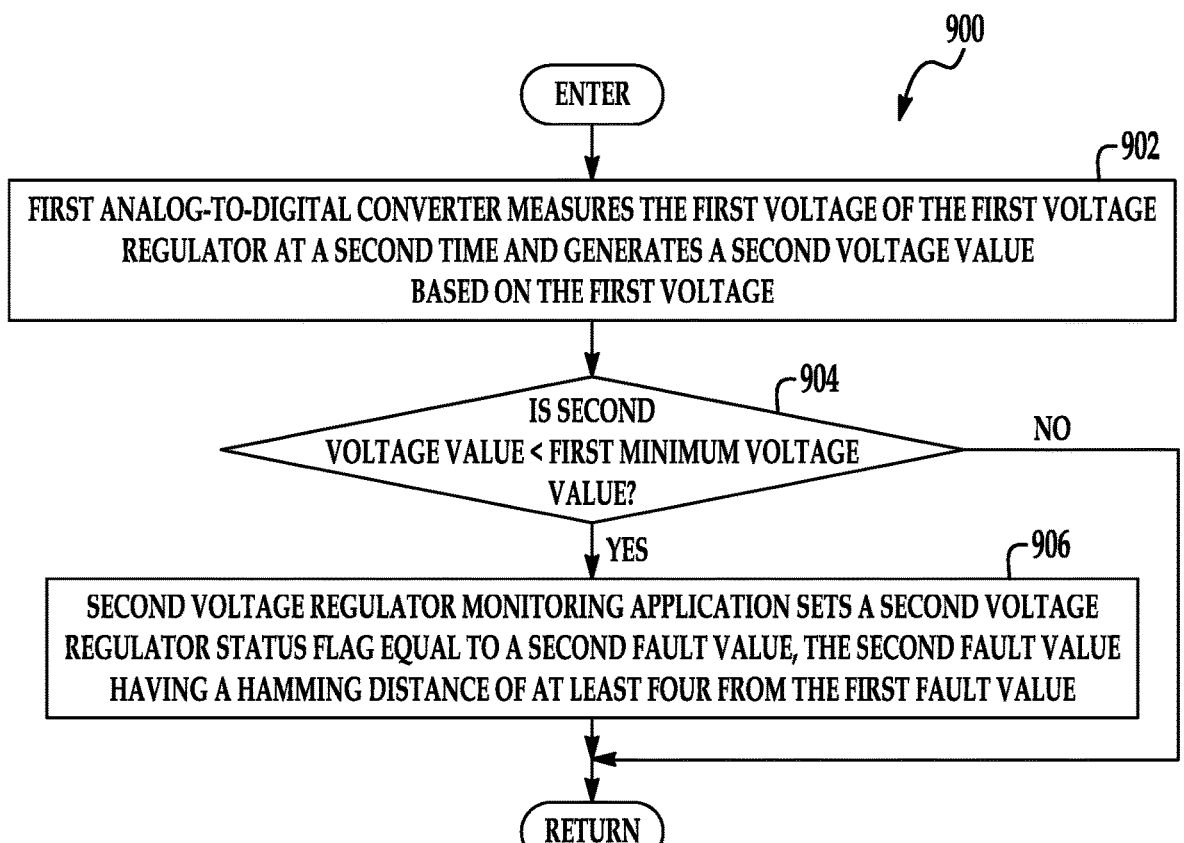
FIG. 8 is a flowchart of a second voltage regulator monitoring application utilized in the diagnostic system of FIG. 1.

At step 808, the microcontroller 380 executes a second voltage regulator monitoring application 900 (shown in FIG. 8). After step 808, the method advances to step 810.

Figure 9:
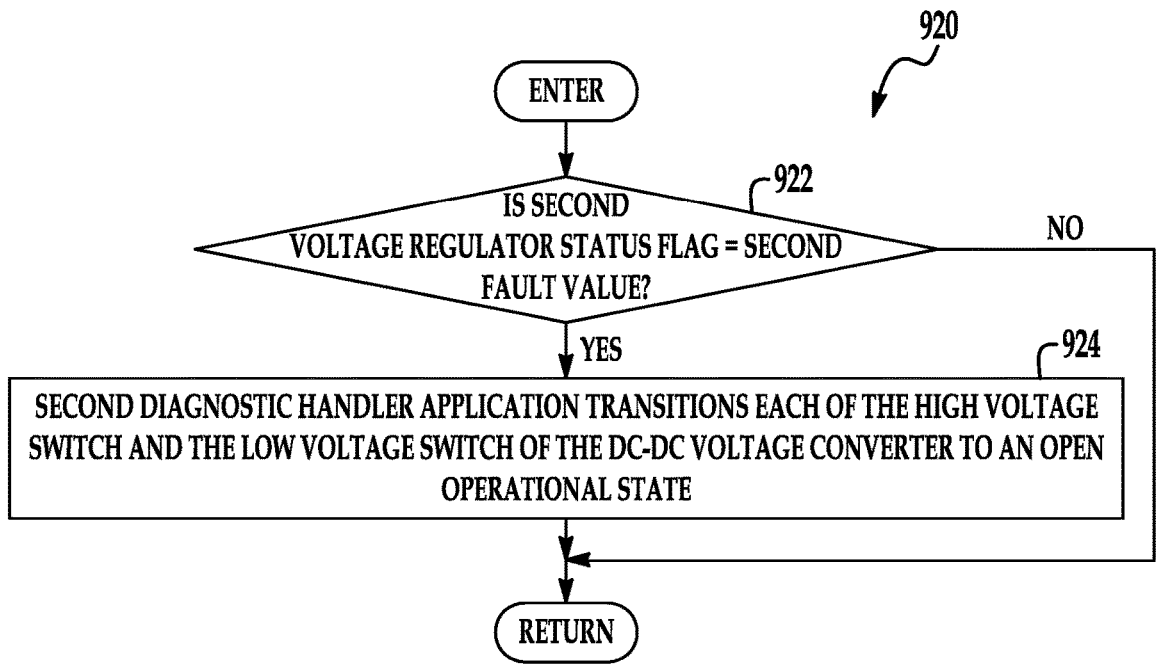
FIG. 9 is a flowchart of a second diagnostic handler application utilized in the diagnostic system of FIG. 1.

At step 810, the microcontroller 380 executes a second diagnostic handler application 920 (shown in FIG. 9). After step 810, the method advances to step 812.

Figure 10:
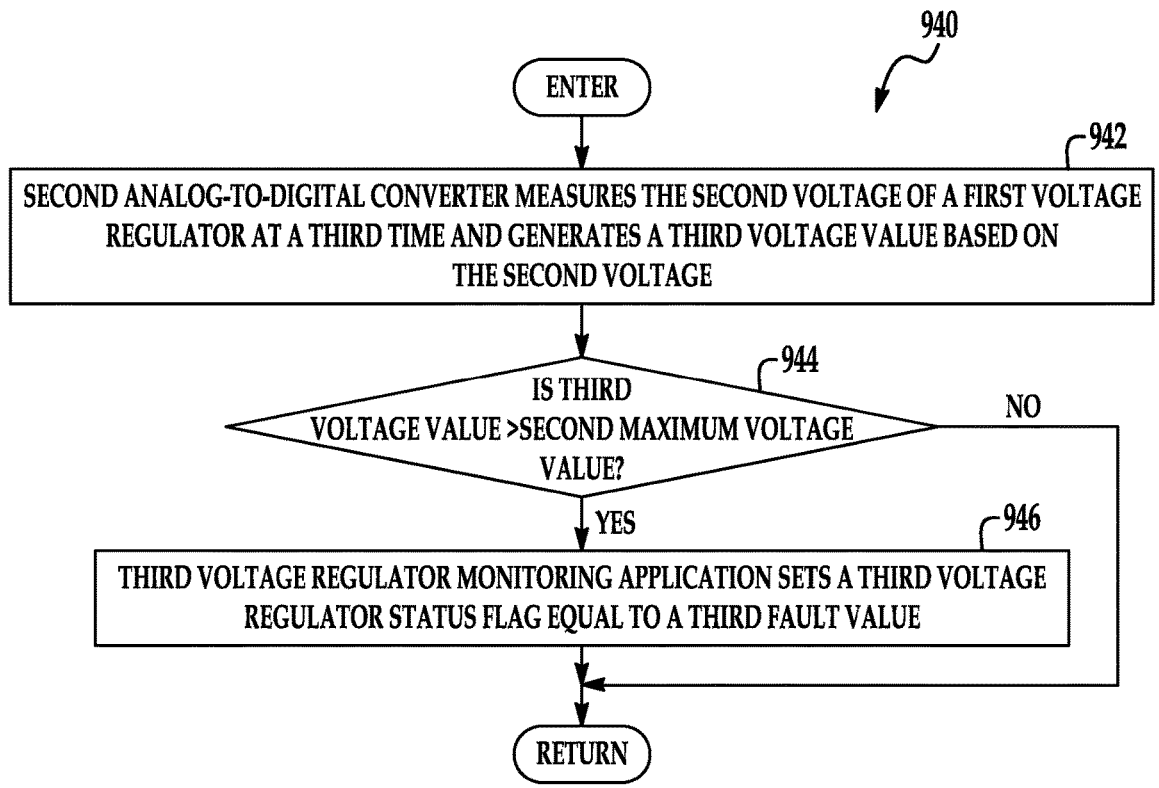
FIG. 10 is a flowchart of a third voltage regulator monitoring application utilized in the diagnostic system of FIG. 1.

At step 812, the microcontroller 380 executes a third voltage regulator monitoring application 940 (shown in FIG. 10). After step 812, the method advances to step 814.

Figure 11:
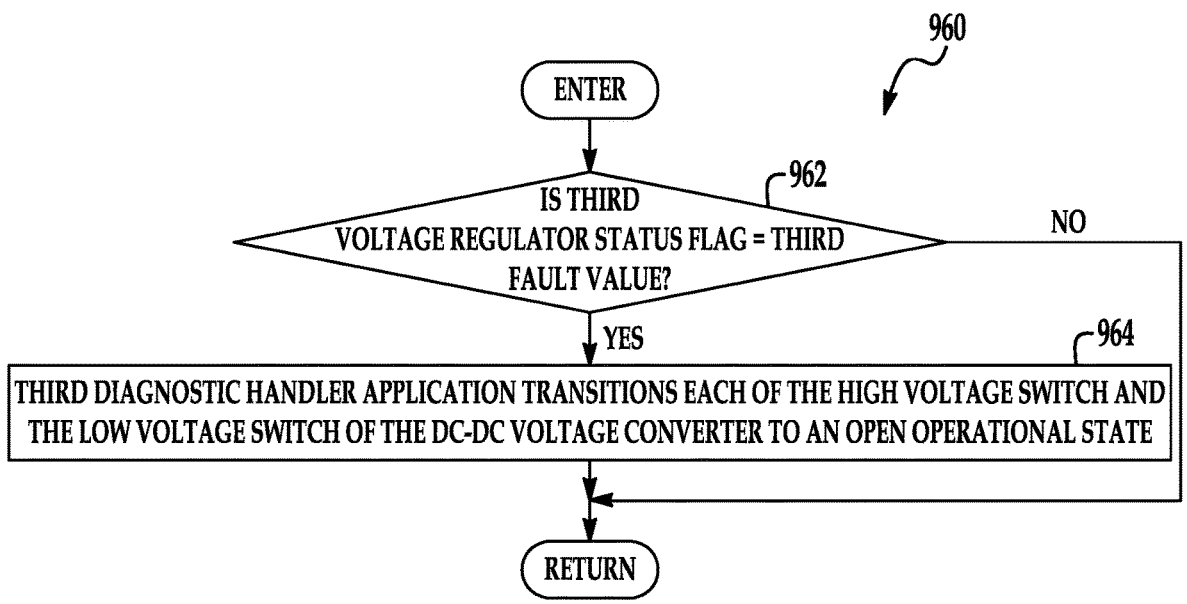
FIG. 11 is a flowchart of a third diagnostic handler application utilized in the diagnostic system of FIG. 1.

At step 814, the microcontroller 380 executes a third diagnostic handler application 960 (shown in FIG. 11). After step 814, the method advances to step 816.

Figure 12:
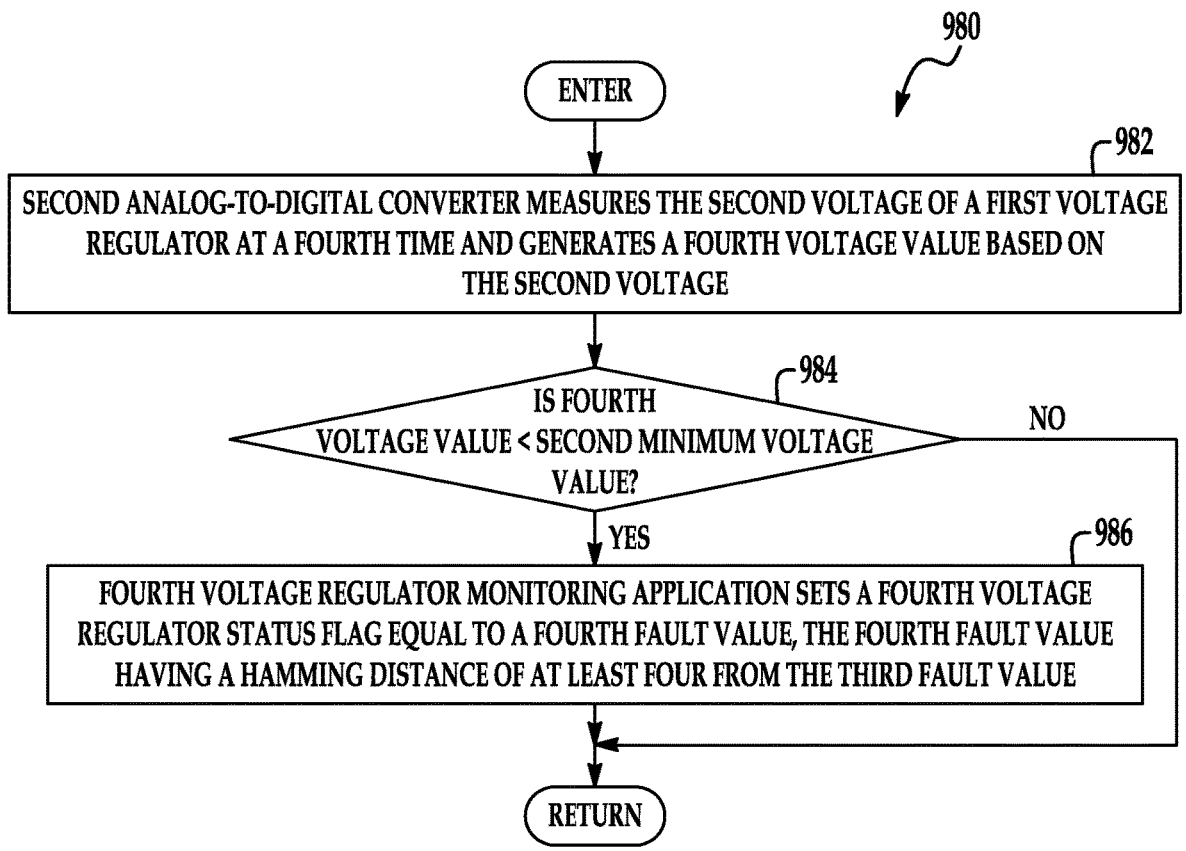
FIG. 12 is a flowchart of a fourth voltage regulator monitoring application utilized in the diagnostic system of FIG. 1.

At step 816, the microcontroller 380 executes a fourth voltage regulator monitoring application 980 (shown in FIG. 12). After step 816, the method advances to step 818.

Figure 13:
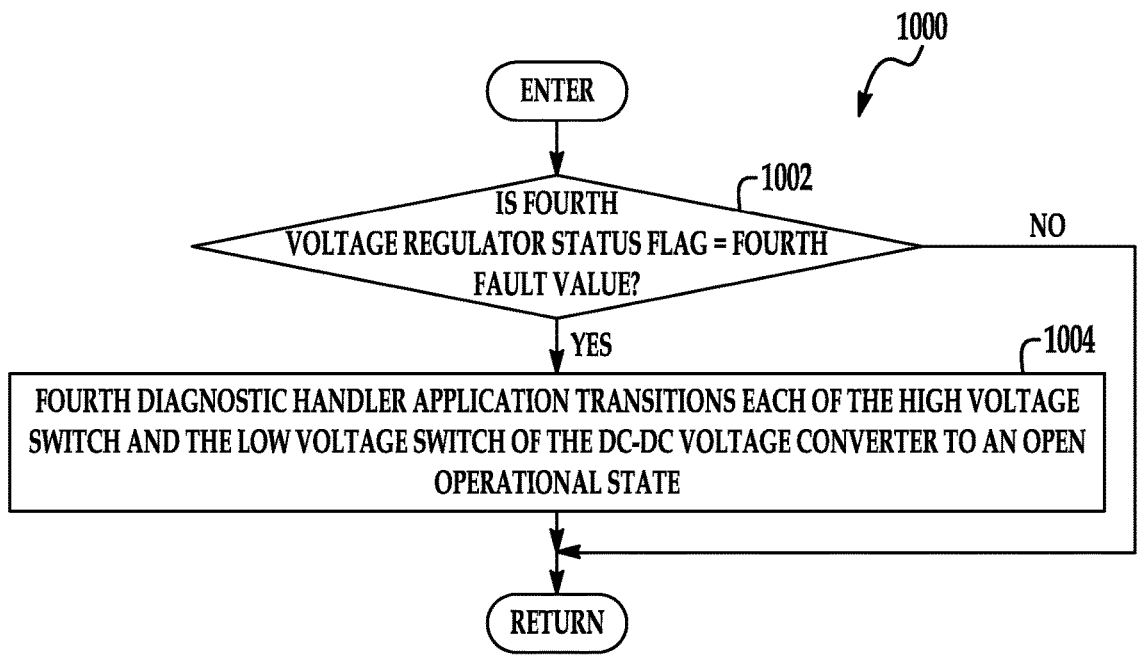
FIG. 13 is a flowchart of a fourth diagnostic handler application utilized in the diagnostic system of FIG. 1.

At step 818, the microcontroller 380 executes a fourth diagnostic handler application 1000 (shown in FIG. 13). After step 818, the method advances to step 830.

Figure 14:
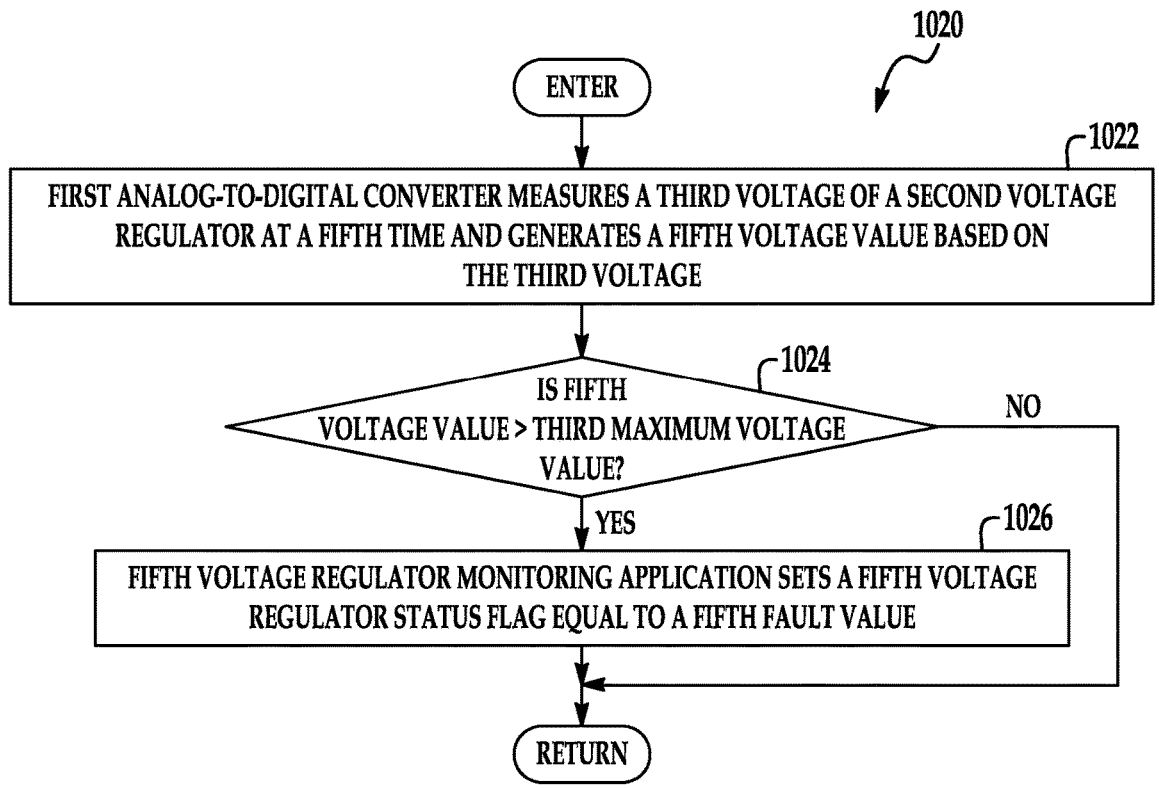
FIG. 14 is a flowchart of a fifth voltage regulator monitoring application utilized in the diagnostic system of FIG. 1.

At step 830, the microcontroller 380 executes a fifth voltage regulator monitoring application 1020 (shown in FIG. 14). After step 830, the method advances to step 832.

Figure 15:
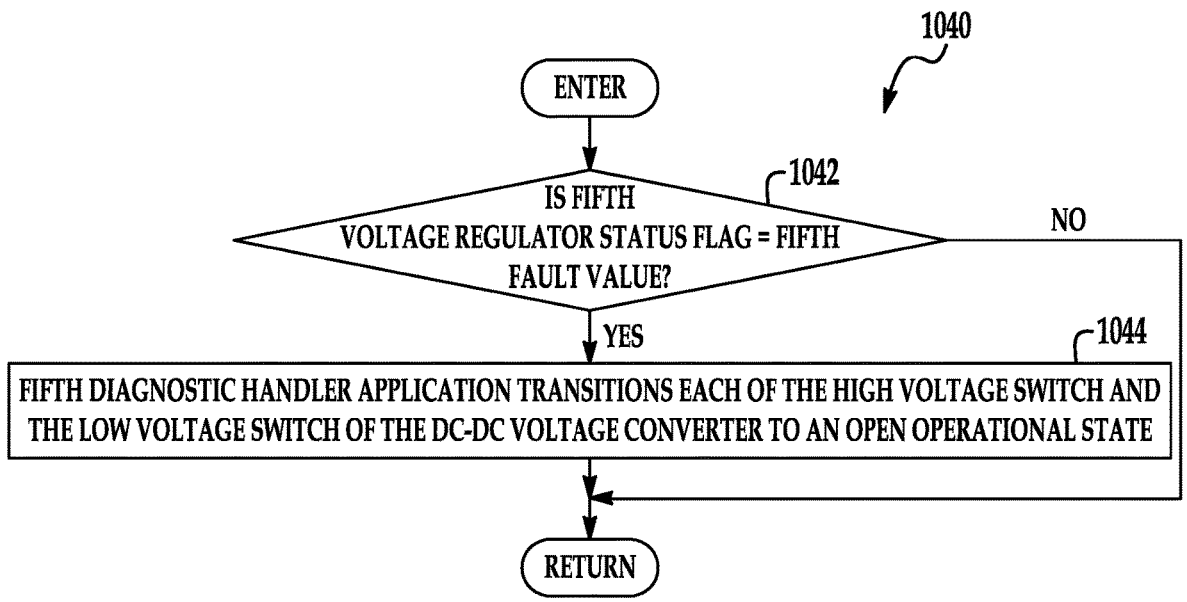
FIG. 15 is a flowchart of a fifth diagnostic handler application utilized in the diagnostic system of FIG. 1.

At step 832, the microcontroller 380 executes a fifth diagnostic handler application 1040 (shown in FIG. 15). After step 832, the method advances to step 834.

Figure 16:
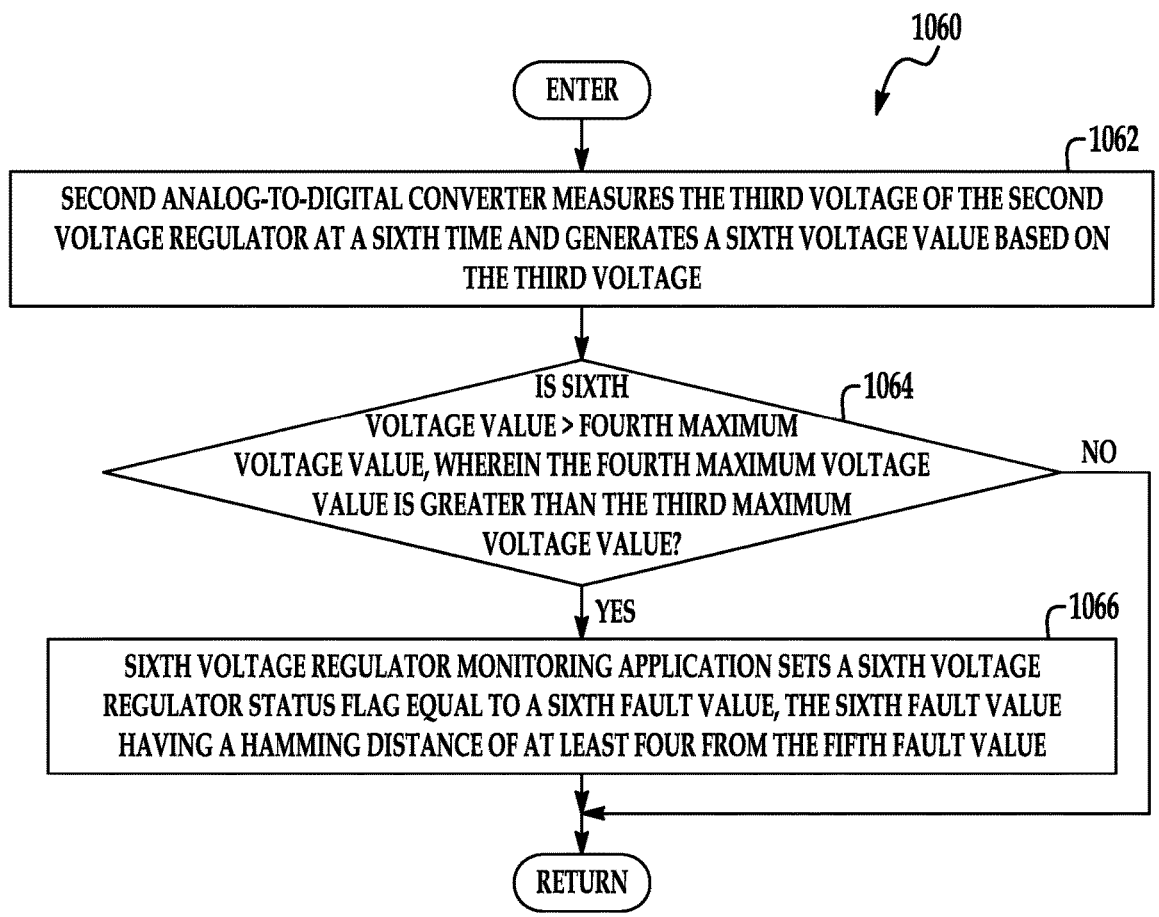
FIG. 16 is a flowchart of a sixth voltage regulator monitoring application utilized in the diagnostic system of FIG. 1.

At step 834, the microcontroller 380 executes a sixth voltage regulator monitoring application 1060 (shown in FIG. 16). After step 834, the method advances to step 836.

Figure 17:
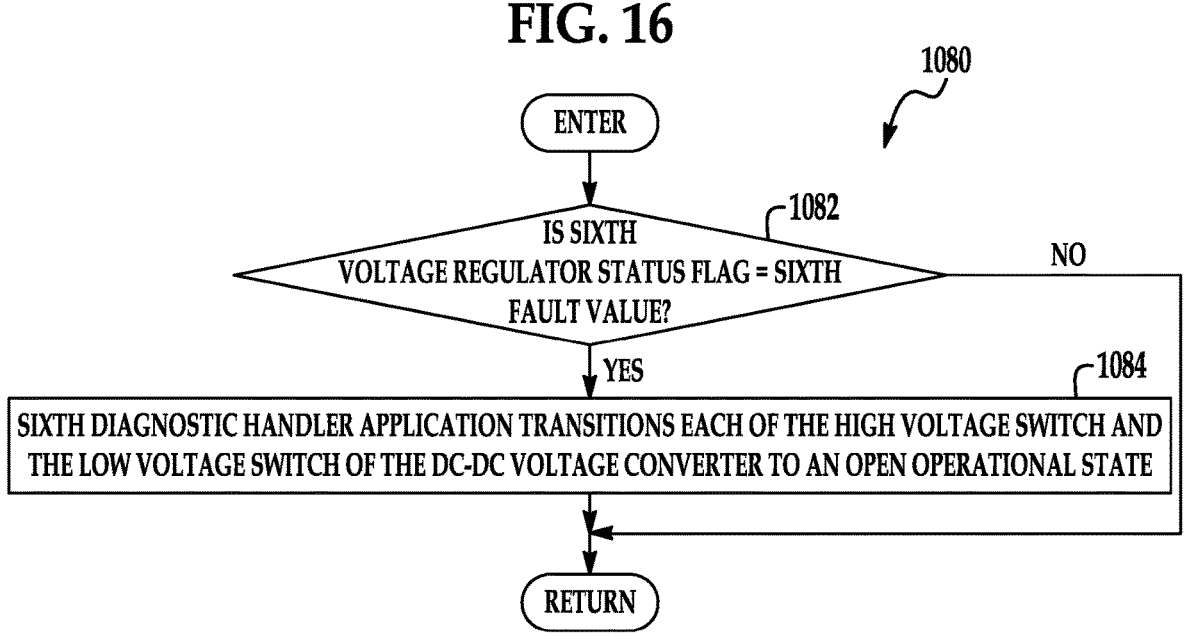
FIG. 17 is a flowchart of a sixth diagnostic handler application utilized in the diagnostic system of FIG. 1.

At step 836, the microcontroller 380 executes a sixth diagnostic handler application 1080 (shown in FIG. 17). After step 836, the method advances to step 838.

Figure 18:
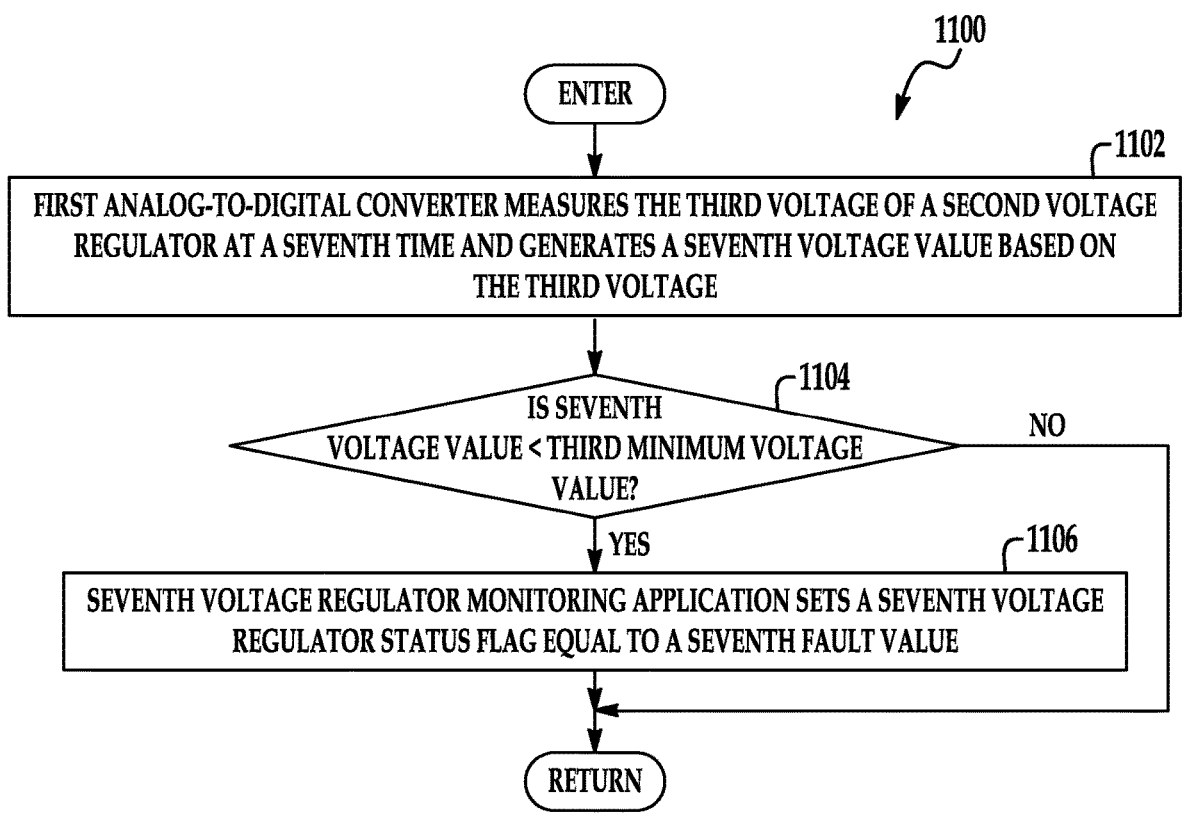
FIG. 18 is a flowchart of a seventh voltage regulator monitoring application utilized in the diagnostic system of FIG. 1.

At step 838, the microcontroller 380 executes a seventh voltage regulator monitoring application 1100 (shown in FIG. 18). After step 838, the method advances to step 840.

Figure 19:
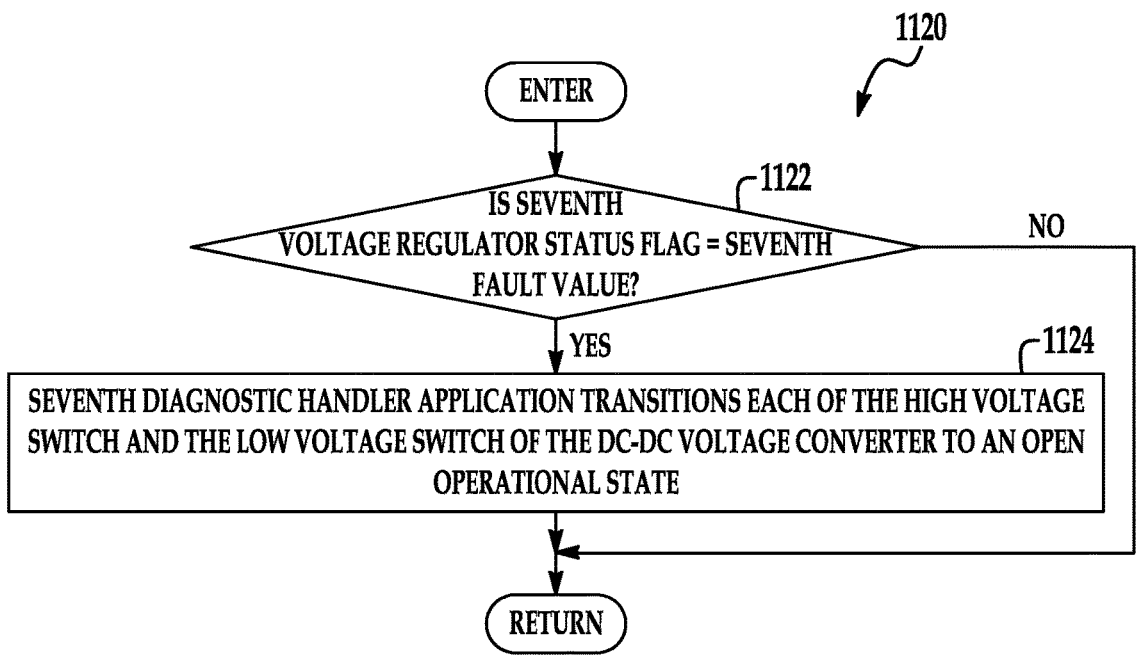
FIG. 19 is a flowchart of a seventh diagnostic handler application utilized in the diagnostic system of FIG. 1.

At step 840, the microcontroller 380 executes a seventh diagnostic handler application 1120 (shown in FIG. 19). After step 840, the method advances to step 842.

Figure 20:
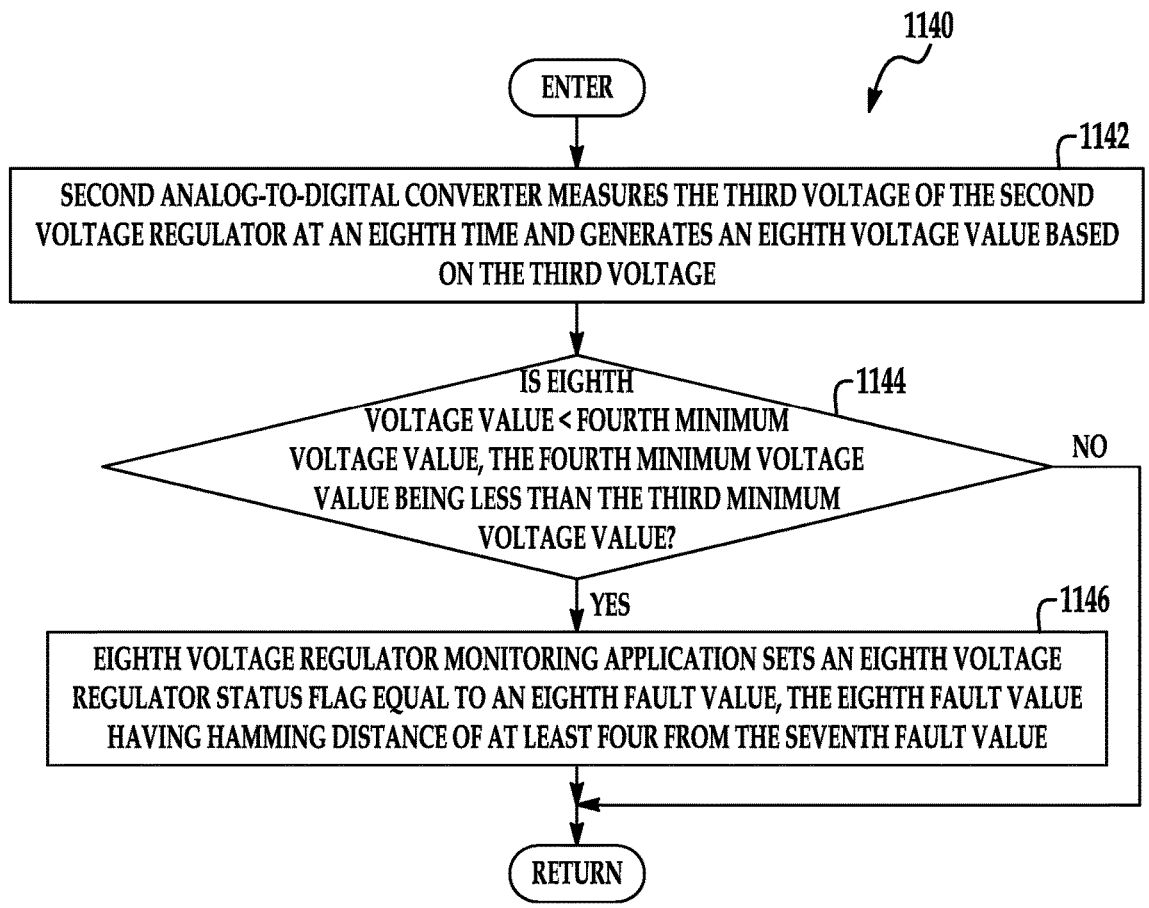
FIG. 20 is a flowchart of an eighth voltage regulator monitoring application utilized in the diagnostic system of FIG. 1.

At step 842, the microcontroller 380 executes an eighth voltage regulator monitoring application 1140 (shown in FIG. 20). After step 842, the method advances to step 844.

Figure 21:
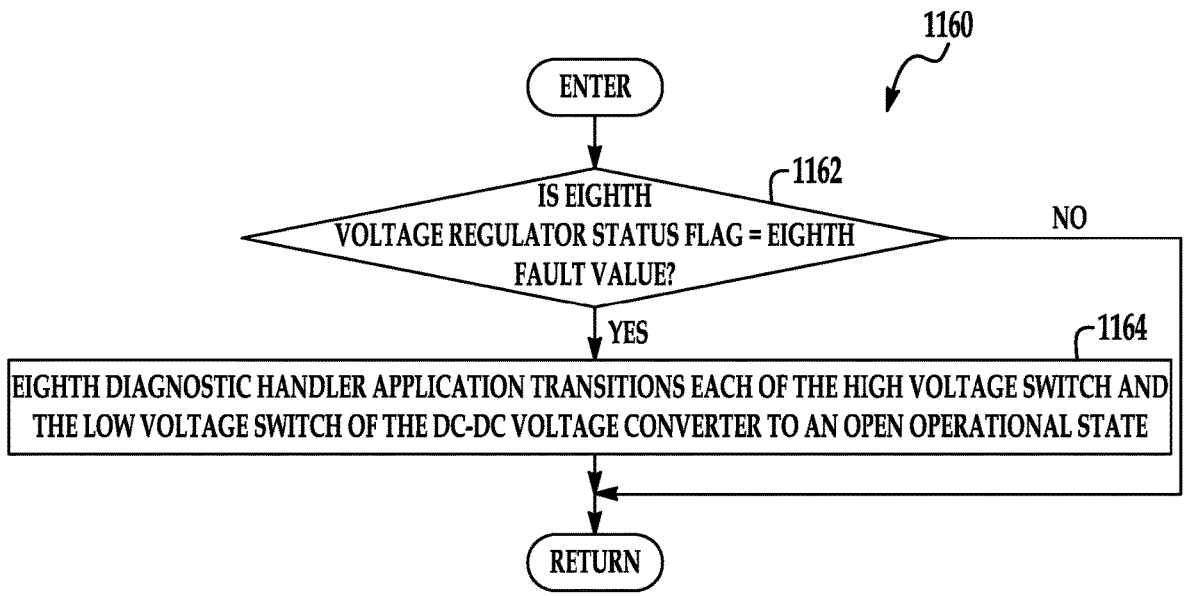
FIG. 21 is a flowchart of an eighth diagnostic handler application utilized in the diagnostic system of FIG. 1.

At step 844, the microcontroller 380 executes an eighth diagnostic handler application (shown in FIG. 21). After step 844, the method is exited.

Referring to FIG. 6, the first voltage regulator monitoring application 860 will now be explained.

At step 862, the first analog-to-digital converter 420 measures a first voltage of a first voltage regulator 112 at a first time and generates a first voltage value based on the first voltage. After step 862, the method advances to step 864.

At step 864, the microcontroller 380 makes a determination as to whether the first voltage value is greater than a first maximum voltage value. If the value of step 864 equals "yes", the method advances to step 866. Otherwise, the method returns to the main application 800.

At step 866, the first voltage regulator monitoring application 860 sets a first voltage regulator status flag equal to a first fault value (e.g., C6 shown in the record 702 of the table 700 in FIG. 2). After step 866, the method returns to the main application 800.

Referring to FIG. 7, the first diagnostic handler application 880 will now be explained.

At step 882, the microcontroller 380 makes a determination as to whether the first voltage regulator status flag is equal to a first fault value. If the value of step 882 equals "yes", the method advances to step 884. Otherwise, the method returns to the main application 800.

At step 884, the first diagnostic handler application 880 transitions each of the high voltage switch 250 and the low voltage switch 254 of the DC-DC voltage converter 100 to an open operational state. After step 884, the method returns to the main application 800.

Referring to FIG. 8, the second voltage regulator monitoring application 900 will now be explained.

At step 902, the first analog-to-digital converter 420 measures the first voltage of the first voltage regulator 112 at a second time and generates a second voltage value based on the first voltage. After step 902, the method advances to step 904.

At step 904, the microcontroller 380 makes a determination as to whether the second voltage value is less than a first minimum voltage value. If the value of step 904 equals "yes", the method advances to step 906. Otherwise, the method returns to the main application 800.

At step 906, the second voltage regulator monitoring application 900 sets a second voltage regulator status flag equal to a second fault value (e.g., 3A shown in the record 704 of the table 700 in FIG. 2). The second fault value has a Hamming distance of at least four from the first fault value. After step 906, the method returns to the main application 800.

Referring to FIG. 9, the second diagnostic handler application 920 will now be explained.

At step 922, the microcontroller 380 makes a determination as to whether a second voltage regulator status flag is equal to a second fault value. If the value of step 922 equals "yes", the method advances to step 924. Otherwise, the method returns to the main application 800.

At step 924, the second diagnostic handler application 920 transitions each of the high voltage switch 250 and the low voltage switch 254 of the DC-DC voltage converter 100 to the open operational state. After step 924, the method returns to the main application 800.

Referring to FIG. 10, the third voltage regulator monitoring application 940 will now be explained.

At step 942, the second analog-to-digital converter 422 measures the second voltage of the first voltage regulator 112 at a third time and generates a third voltage value based on the second voltage. After step 942, the method advances to step 944.

At step 944, the microcontroller 380 makes a determination as to whether the third voltage value is greater than a second maximum voltage value. If the value of step 944 equals "yes", the method advances to step 946. Otherwise, the method returns to the main application 800.

At step 946, the third voltage regulator monitoring application 940 sets a third voltage regulator status flag equal to a third fault value (e.g., 6C shown in the record 706 of the table 700 in FIG. 2). After step 946, the method returns to the main application 800.

Referring to FIG. 11, the third diagnostic handler application 960 will now be explained.

At step 962, the microcontroller 380 makes a determination as to whether the third voltage regulator status flag is equal to the third fault value. If the value of step 962 equals "yes", the method advances to step 964. Otherwise, the method returns to the main application 800.

At step 964, the third diagnostic handler application 960 transitions each of the high voltage switch 250 and the low voltage switch 254 of the DC-DC voltage converter 100 to the open operational state. After step 964, the method returns to the main application 800.

Referring to FIG. 12, the fourth voltage regulator monitoring application 980 will now be explained.

At step 982, the second analog-to-digital converter 422 measures the second voltage of the first voltage regulator 112 at a fourth time and generates a fourth voltage value based on the second voltage. After step 982, the method advances to step 984.

At step 984, the microcontroller 380 makes a determination as to whether the fourth voltage value is less than a second minimum voltage value. If the value step 984 equals "yes", the method advances to step 986. Otherwise, the method returns to the main application 800.

At step 986, the fourth voltage regulator monitoring application 980 sets a fourth voltage regulator status flag equal to a fourth fault value (e.g., A3 shown in the record 708 of the table 700 in FIG. 2). The fourth fault value has a Hamming distance of at least four from the third fault value. After step 986, the method returns to the main application 800.

Referring to FIG. 13, the fourth diagnostic handler application 1000 will now be explained.

At step 1002, the microcontroller 380 makes a determination as to whether the fourth voltage regulator status flag is equal to the fourth fault value. If the value of step 1002 equals "yes", the method advances to step 1004. Otherwise, the method returns to the main application 800.

At step 1004, the fourth diagnostic handler application 1000 transitions each of the high voltage switch 250 and the low voltage switch 254 of the DC-DC voltage converter 100 to the open operational state. After step 1004, the method returns to the main application 800.

Referring to FIG. 14, the fifth voltage regulator monitoring application 1020 will now be explained.

At step 1022, the first analog-to-digital converter 420 measures a third voltage of a second voltage regulator 114 at a fifth time and generates a fifth voltage value based on the third voltage. After step 1022, the method advances to step 1024.

At step 1024, the microcontroller 380 makes a determination as to whether the fifth voltage value is greater than a third maximum voltage value. If the value of step 1024 equals "yes", the method advances to step 1026. Otherwise, the method returns to the main application 800.

At step 1026, the fifth voltage regulator monitoring application 1020 sets a fifth voltage regulator status flag equal to a fifth fault value (e.g., 5C shown in the record 710 of the table 700 in FIG. 2). After step 1026, the method returns to the main application 800.

Referring to FIG. 15, the fifth diagnostic handler application 1040 will now be explained.

At step 1042, the microcontroller 380 makes a determination as to whether the fifth voltage regulator status flag is equal to the fifth fault value. If the value of step 1042 equals "yes", the method advances to step 1044. Otherwise, the method returns to the main application 800.

At step 1044, the fifth diagnostic handler application 1040 transitions each of the high voltage switch 250 and the low voltage switch 254 of the DC-DC voltage converter 100 to an open operational state. After step 1044, the method returns to the main application 800.

Referring to FIG. 16, the sixth voltage regulator monitoring application 1060 will now be explained.

At step 1062, the second analog-to-digital converter 422 measures the third voltage of the second voltage regulator 114 at a sixth time and generates a sixth voltage value based on the third voltage. After step 1062, the method advances to step 1064.

At step 1064, the microcontroller 380 makes a determination as to whether the sixth voltage value is greater than a fourth maximum voltage value, wherein the fourth maximum voltage value is greater than the third maximum voltage value. If the value of step 1064 equals "yes", the method advances to step 1066. Otherwise, the method returns to the main application 800.

At step 1066, the sixth voltage regulator monitoring application 1060 sets a sixth voltage regulator status flag equal to a sixth fault value (e.g., C5 shown in the record 712 of the table 700 in FIG. 2). The sixth fault value has a Hamming distance of at least four from the fifth fault value. After step 1066, the method returns to the main application 800.

Referring to FIG. 17, the sixth diagnostic handler application 1080 will now be explained.

At step 1082, the microcontroller 380 makes a determination as to whether the sixth voltage regulator status flag is equal to the sixth fault value. If the value of step 1082 equals "yes", the method advances to step 1084. Otherwise, the method returns to the main application 800.

At step 1084, the sixth diagnostic handler application 1080 transitions each of the high voltage switch 250 and the low voltage switch 254 of the DC-DC voltage converter 100 to the open operational state. After step 1084, the method returns to the main application 800.

Referring to FIG. 18, the seventh voltage regulator monitoring application 1100 will now be explained.

At step 1102, the first analog-to-digital converter 420 measures the third voltage of the second voltage regulator 114 at a seventh time and generates a seventh voltage value based on the third voltage. After step 1102, the method advances to step 1104.

At step 1104, the microcontroller 380 makes a determination as to whether the seventh voltage value is less than a third minimum voltage value. If the value of step 1104 equals "yes", the method advances to step 1106. Otherwise, the method returns to the main application 800.

At step 1106, the seventh voltage regulator monitoring application 1100 sets a seventh voltage regulator status flag equal to a seventh fault value (e.g., 65 shown in the record 714 of the table 700 in FIG. 2). After step 1106, the method returns to the main application 800.

Referring to FIG. 19, the seventh diagnostic handler application 1120 will now be explained.

At step 1122, the microcontroller 380 makes a determination as to whether the seventh voltage regulator status flag is equal to the seventh fault value. If the value of step 1122 equals "yes", the method advances to step 1124. Otherwise, the method returns to the main application 800.

At step 1124, the seventh diagnostic handler application 1120 transitions each of the high voltage switch 250 and the low voltage switch 254 of the DC-DC voltage converter 100 to the open operational state. After step 1124, the method returns to the main application 800.

Referring to FIG. 20, the eighth voltage regulator monitoring application 1140 will now be explained.

At step 1142, the second analog-to-digital converter 422 measures the third voltage of the second voltage regulator 114 at an eighth time and generates an eighth voltage value based on the third voltage. After step 1142, the method advances to step 1144.

At step 1144, the microcontroller 380 makes a determination as to whether the eighth voltage value is less than a fourth minimum voltage value. The fourth minimum voltage value is less than the third minimum voltage value. If the value of step 1144 equals "yes", the method advances to step 1146. Otherwise, the method returns to the main application 800.

At step 1146, the eighth voltage regulator monitoring application 1140 sets an eighth voltage regulator status flag equal to an eighth fault value (e.g., 56 shown in the record 716 of the table 700 in FIG. 2). The eighth fault value has a Hamming distance of at least four from the seventh fault value. After step 1146, the method returns to the main application 800.

Referring to FIG. 21, the eighth diagnostic handler application 1160 will now be explained.

At step 1162, the microcontroller 380 makes a determination as to whether the eighth voltage regulator status flag is equal to the eighth fault value. If the value of step 1162 equals "yes", the method advances to step 1164. Otherwise, the method returns to the main application 800.

At step 1164, the eighth diagnostic handler application transitions each of the high voltage switch 250 and the low voltage switch 254 of the DC-DC voltage converter 100 to the open operational state. After step 1164, the method returns to the main application 800.

The diagnostic system described herein for a vehicle electrical system having a DC-DC voltage converter and a voltage converter provides a substantial advantage over other systems. In particular, the diagnostic system described herein utilizes first and second voltage regulator monitoring applications that can each separately detect an overvoltage condition in the first voltage regulator. Further, the diagnostic system utilizes fault values having a Hamming distance of at least four from one another to eliminate memory overwrite errors associated with status flags utilizing the values.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A diagnostic system for a vehicle electrical system having a DC-DC voltage converter and a voltage regulator, the DC-DC voltage converter having a DC-DC voltage converter control circuit coupled between a high voltage switch and a low voltage switch, the voltage regulator having first and second output terminals outputting first and second voltages, respectively, comprising:

a microcontroller having a microprocessor and a first analog-to-digital converter, the microprocessor having first and second voltage regulator monitoring applications and first and second diagnostic handler applications;

the first analog-to-digital converter measuring the first voltage of the voltage regulator at a first time and generating a first voltage value based on the first voltage;

the first voltage regulator monitoring application setting a first voltage regulator status flag equal to a first fault value when the first voltage value is greater than a first maximum voltage value;

the first diagnostic handler application transitioning each of the high voltage switch and the low voltage switch to an open operational state when the first voltage regulator status flag is equal to the first fault value;

the first analog-to-digital converter measuring the first voltage at a second time and generating a second voltage value based on the first voltage;

the second voltage regulator monitoring application setting a second voltage regulator status flag equal to a second fault value when the second voltage value is less than a first minimum voltage value; and the second diagnostic handler application transitioning each of the high voltage switch and the low voltage switch to the open operational state when the second voltage regulator status flag is equal to the second fault value.

2. The diagnostic system of claim 1, wherein:

the microcontroller further having a second analog-to-digital converter, the microprocessor further having a third and fourth voltage regulator monitoring applications and third and fourth diagnostic handler applications;

the second analog-to-digital converter measuring the second voltage of the voltage regulator at a third time and generating a third voltage value based on the second voltage;

the third voltage regulator monitoring application setting a third voltage regulator status flag equal to a third fault value when the third voltage value is greater than a second maximum voltage value;

the third diagnostic handler application transitioning each of the high voltage switch and the low voltage switch to the open operational state when the third voltage regulator status flag is equal to the third fault value;

the second analog-to-digital converter measuring the second voltage of the voltage regulator at a fourth time and generating a fourth voltage value based on the second voltage;

the fourth voltage regulator monitoring application setting a fourth voltage regulator status flag equal to a fourth fault value when the fourth voltage value is less than a second minimum voltage value; and the fourth diagnostic handler application transitioning each of the high voltage switch and the low voltage switch to the open operational state when the fourth voltage regulator status flag is equal to the fourth fault value.

3. The diagnostic system of claim 2, wherein the first fault value has a Hamming distance of at least four from the second fault value.

4. The diagnostic system of claim 3, wherein the third fault value has a Hamming distance of at least four from the fourth fault value.

5. The diagnostic system of claim 1, wherein the first voltage is substantially 5 Vdc when the voltage regulator is operating as desired, and the second voltage is substantially 3.3 Vdc when the voltage regulator is operating as desired.

6. A diagnostic system for a vehicle electrical system having a DC-DC voltage converter and a voltage regulator, the DC-DC voltage converter having a DC-DC voltage converter control circuit coupled between a high voltage switch and a low voltage switch, the voltage regulator having a first output terminal outputting a first voltage, comprising a microcontroller having a microprocessor and first and second analog-to-digital converters, the microprocessor having first and second voltage regulator monitoring applications and first and second diagnostic handler applications;

the first analog-to-digital converter measuring the first voltage of the voltage regulator at a first time and generating a first voltage value based on the first voltage;

the first voltage regulator monitoring application setting a first voltage regulator status flag equal to a first fault value when the first voltage value is greater than a first maximum voltage value;

the first diagnostic handler application transitioning each of the high voltage switch and the low voltage switch to an open operational state when the first voltage regulator status flag is equal to the first fault value;

the second analog-to-digital converter measuring the first voltage at a second time and generating a second voltage value based on the first voltage;

the second voltage regulator monitoring application setting a second voltage regulator status flag equal to a second fault value when the second voltage value is greater than a second maximum voltage value, the second maximum voltage value being greater than the first maximum voltage value; and the second diagnostic handler application transitioning each of the high voltage switch and the low voltage switch to the open operational state when the second voltage regulator status flag is equal to the second fault value.

7. The diagnostic system of claim 6, wherein:

the microprocessor having third and fourth voltage regulator monitoring applications and third and fourth diagnostic handler applications;

the first analog-to-digital converter measuring the first voltage of the voltage regulator at a third time and generating a third voltage value based on the first voltage;

the first voltage regulator monitoring application setting a third voltage regulator status flag equal to a third fault value when the third voltage value is less than a first minimum voltage value;

the third diagnostic handler application transitioning each of the high voltage switch and the low voltage switch to the open operational state when the third voltage regulator status flag is equal to the third fault value;

the second analog-to-digital converter measuring the first voltage at a fourth time and generating a fourth voltage value based on the first voltage;

the fourth voltage regulator monitoring application setting a fourth voltage regulator status flag equal to a fourth fault value when the fourth voltage value is less than a second minimum voltage value, the second minimum voltage value being less than the first minimum voltage value; and the fourth diagnostic handler application transitioning each of the high voltage switch and the low voltage switch to the open operational state when the fourth voltage regulator status flag is equal to the fourth fault value.

8. The diagnostic system of claim 7, wherein the first fault value has a Hamming distance of at least four from the second fault value.

9. The diagnostic system of claim 7, wherein the third fault value has a Hamming distance of at least four from the fourth fault value.

10. The diagnostic system of claim 6, wherein the first voltage is substantially 12 Vdc when the voltage regulator is operating as desired.

* * * * *